United States Patent
Gao et al.

(10) Patent No.: US 11,317,388 B2
(45) Date of Patent: *Apr. 26, 2022

(54) METHOD AND APPARATUS FOR COMMUNICATION BASED ON SHORT TRANSMISSION TIME INTERVALS IN A WIRELESS COMMUNICATION SYSTEM

(71) Applicant: NEC CORPORATION, Minato-ku (JP)

(72) Inventors: Yukai Gao, Beijing (CN); Chuangxin Jiang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/953,057

(22) Filed: Nov. 19, 2020

(65) Prior Publication Data

US 2021/0076373 A1    Mar. 11, 2021

Related U.S. Application Data

(63) Continuation of application No. 16/234,103, filed on Dec. 27, 2018, which is a continuation of application
(Continued)

(51) Int. Cl.
*H04W 72/04* (2009.01)
*H04W 72/12* (2009.01)
(Continued)

(52) U.S. Cl.
CPC ....... *H04W 72/0413* (2013.01); *H04L 5/0051* (2013.01); *H04L 5/0055* (2013.01);
(Continued)

(58) Field of Classification Search
CPC .......... H04W 72/0413; H04W 72/1289; H04L 5/0051; H04L 5/0055; H04L 5/0094; H04L 1/1671; H04L 1/1854
See application file for complete search history.

(56) References Cited

U.S. PATENT DOCUMENTS

2012/0082119 A1    4/2012  Chung et al.
2013/0155974 A1*   6/2013  Papasakellariou .. H04W 72/042
                                              370/329
(Continued)

FOREIGN PATENT DOCUMENTS

CN    102577294 A    7/2012
CN    102859900 A    1/2013
(Continued)

OTHER PUBLICATIONS

Ericsson, Study of shorter TTI for latency reduction, 3GPP TSG-RAN WG2 #91bis, Malmö, Sweden, Oct. 5-9, 2015, R2-154740 (Year: 2015).*

(Continued)

*Primary Examiner* — Shailendra Kumar
(74) *Attorney, Agent, or Firm* — Sughrue Mion, PLLC

(57) ABSTRACT

Embodiments of the present disclosure relate to the communication processes in a wireless communication system based on short TTIs. According to one embodiment of the present disclosure, there provide a method for communication by a base station. The method comprise: receiving, from a user equipment, an uplink demodulation reference signal, DMRS, in an uplink transmission time interval, TTI, of an uplink subframe, which supports two or more uplink TTIs. At least one uplink TTI supported by the uplink subframe is configured to only transmit uplink control information and/or uplink data without any uplink DMRS. In the other aspects of the present disclosure, there also provides methods for communication by a user equipment and corresponding apparatuses.

19 Claims, 17 Drawing Sheets

Related U.S. Application Data

No. 16/072,543, filed on Jul. 25, 2018, now Pat. No. 10,841,907.

(51) Int. Cl.
  *H04L 5/00* (2006.01)
  *H04L 1/18* (2006.01)
  *H04L 1/16* (2006.01)

(52) U.S. Cl.
  CPC ....... *H04L 5/0094* (2013.01); *H04W 72/1289* (2013.01); *H04L 1/1671* (2013.01); *H04L 1/1854* (2013.01)

(56) References Cited

U.S. PATENT DOCUMENTS

| | | | |
|---|---|---|---|
| 2013/0294366 A1 | 11/2013 | Papasakellariou et al. | |
| 2013/0336135 A1 | 12/2013 | Lindoff et al. | |
| 2014/0286255 A1 | 9/2014 | Nam | |
| 2014/0293881 A1* | 10/2014 | Khoshnevis | H04L 5/0046 370/329 |
| 2015/0230211 A1* | 8/2015 | You | H04W 72/04 370/330 |
| 2016/0057753 A1* | 2/2016 | Yang | H04L 5/0051 370/336 |
| 2016/0112171 A1* | 4/2016 | Sorrentino | H04W 72/042 370/329 |
| 2016/0270072 A1 | 9/2016 | Andggart | |
| 2017/0149542 A1 | 5/2017 | Lee | |
| 2018/0069652 A1* | 3/2018 | Yamamoto | H04L 1/0009 |
| 2018/0115984 A1 | 4/2018 | Sahlin | |
| 2018/0212733 A1 | 7/2018 | Khoryaev et al. | |
| 2018/0324767 A1* | 11/2018 | Manolakos | H04W 72/0413 |

FOREIGN PATENT DOCUMENTS

| | | |
|---|---|---|
| CN | 103428777 A | 12/2013 |
| CN | 103931126 A | 7/2014 |
| CN | 104396202 A | 3/2015 |
| JP | 2007-514352 A | 5/2007 |
| JP | 2013-510541 A | 3/2013 |
| JP | 2013510541 A | 3/2013 |
| JP | 2013-81211 A | 5/2013 |
| JP | 2016-536928 A | 11/2016 |
| JP | 2018-516472 A | 6/2018 |
| WO | 2014/113546 A1 | 7/2014 |
| WO | 2014/153777 A1 | 10/2014 |
| WO | 2014/155899 A1 | 10/2014 |
| WO | 2014155198 A2 | 10/2014 |
| WO | 2014/178764 A1 | 11/2014 |
| WO | 2015/023220 A1 | 2/2015 |
| WO | 2015018000 A1 | 2/2015 |
| WO | 2015/042810 A1 | 4/2015 |
| WO | 2016/161619 A1 | 10/2016 |
| WO | 2017078595 A1 | 5/2017 |

OTHER PUBLICATIONS

Etri, Discussion on TTI shortening, 3GPP TSG RAN WG1 Meeting #83, Anaheim, USA, Nov. 16-20, 2015, R1-157110 (Year: 2015).*
International Search Report of PCT/CN2016/073221 dated Oct. 26, 2016.
Intel Corporation, "Demodulation Enhancements for V2V/V2X Communication", 3GPP TSG RAN WG1 Meeting #82bis, R1-155330, Oct. 5-9, 2015, Malmo, Sweden, pp. 1-9 (9 pages total).
Ericsson, "Study of shorter TTI for latency reduction", 3GPP TSG-RAN WG2 #91 bis, Tdoc R2-154740, Oct. 5-9, 2015, Malmo, Sweden, pp. 1-8 (8 pages total).
First Examination Report corresponding to Australian Patent Application No. 2019236727 dated Aug. 31, 2020.
Communication dated Jun. 11, 2019, from the European Patent Office in counterpart European Application No. 16888666.1.
Zte, "L1 considerations on latency reduction", 3GPP TSG RAN WG1 Meeting #83, R1-157151, Nov. 15-22, 2015, Anaheim, USA, pp. 1-6 (6 pages total).
Ericsson, "Evaluation methodology for latency reduction techniques", 3GPP TSG RAN WG1 Meeting #83, R1-157145, Nov. 15-22, 2015, Anaheim, USA, pp. 1-6 (6 pages total).
R1-156458—3GPP TSG RAN WG1 Meeting #83, Anaheim, USA, Nov. 15-22, 2015.
Communication dated Dec. 6, 2019, issued by the Korean Intellectual Property Office in corresponding Korean Application No. 10-2018-7022083.
Communication dated Jun. 11, 2019, from the Japanese Patent Office in counterpart Application No. 2018-539961.
Nec, "Uplink Reference Signal Enhancement for Low Cost MTC", 3GPP TSG RAN WG1 Meeting #76, R1-140417, Feb. 10-14, 2014, Prague, Czech Republic, pp. 1-4 (4 pages total).
Sophia Antipolis, "3rd Generation Partnership Project; Technical Specification Group Radio Access Network; Evolved Universal Terrestrial Radio Access (E-UTRA); Physical channels and modulation (Release 13)", 3GPP TS 36.211, V13.0.0, Dec. 2015, Valbonne, France, pp. 1-141 (141 pages total).
First Examination Report corresponding to Indian Patent Application No. 201817032755, dated Aug. 28, 2020.
Communication dated Sep. 19, 2019, from Australian Patent Office in counterpart Australian Application No. 2016391189.
R1-156613—3GPP TSG RAN WG1 #83, Anaheim, CA USA, Nov. 15-22, 2015.
Etri, "Discussion on TTI shortening", 3GPP TSG RAN WGl Meeting #83, R1-157110, Nov. 16-20, 2015, Anaheim, USA, pp. 1-7 (7 pages total).
Communication dated Sep. 26, 2018, from Australian Patent Office in counterpart application No. 2016391189.
Communication dated Apr. 1, 2020, from the European Patent Office in Application No. 16888666.1.
Sophia Antipolis, "3rd Generation Partnership Project; Technical Specification Group Radi Access Network; Evolved Universal Terrestrial Radio Access (E-UTRA); Radio Resource Control (RRC); Protocol specification (Release 13)", 3GPP TS 36.331, V13.0.0, Dec. 2015, Valbonne, France, pp. 1-507 (507 pages total).
Fujitsu, "Discussion on Possible schemes in high Doppler case", 3GPP TSG RAN WG1 Meeting #83, R1-156617, Nov. 15-22, 2015, Anaheim, USA, pp. 1-4 (4 pages total).
Written Opinion of the International Searching Authority of PCT/CN2016/073221 dated Oct. 26, 2016.
European Office Action corresponding to European Patent Application No. 16888666.1, dated Oct. 14, 2020.
Korean Office Action corresponding to Korean Patent Application No. 10-2018-7022083, dated Oct. 7, 2020.
Chinese Office Communication for CN Application No. 201680080790.6 dated Jan. 26, 2022 with English Translation.

* cited by examiner

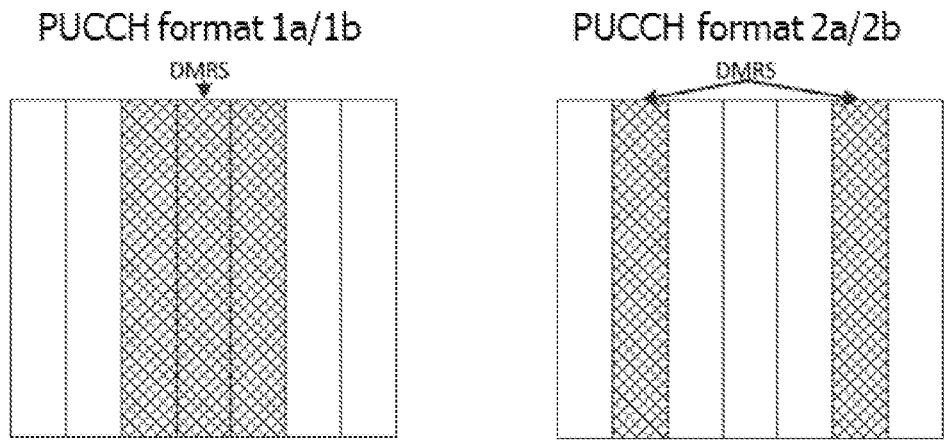
Fig. 1A
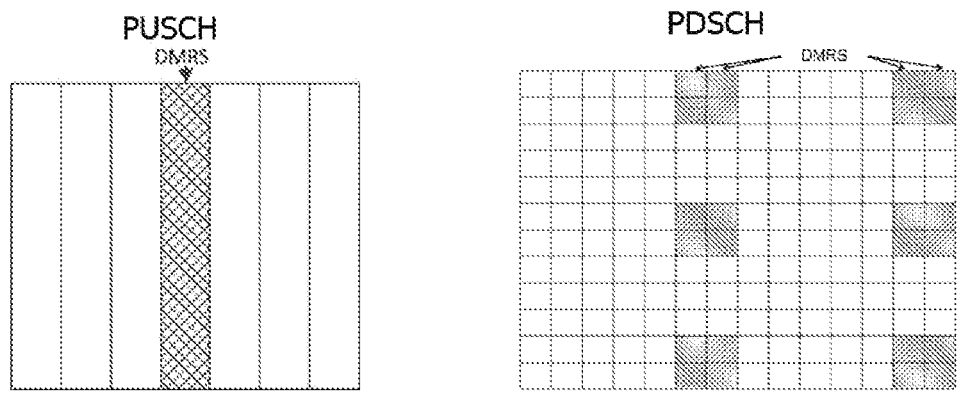
Fig. 1B
Fig. 1C

S510

Receiving, from a user equipment, an uplink DMRS in an uplink TTI of an uplink subframe which supports two or more uplink TTIs, at least one uplink TTI being arranged not to transmit uplink DRMS

S610 transmitting, to a base station, an uplink DMRS in an uplink TTI of an uplink subframe, which supports two or more uplink TTIs, at least one TTI being arranged not to transmit uplink DMRS

METHOD AND APPARATUS FOR COMMUNICATION BASED ON SHORT TRANSMISSION TIME INTERVALS IN A WIRELESS COMMUNICATION SYSTEM

CROSS REFERENCE TO RELATED APPLICATIONS

This application is a Continuation of U.S. patent application Ser. No. 16/234,103, filed on Dec. 27, 2018, which is a Continuation of U.S. application Ser. No. 16/072,543, filed on Jul. 25, 2018, which is a National Stage of International Application No. PCT/CN2016/073221, filed on Feb. 2, 2016, the contents of all of which are incorporated herein by reference in their entirety.

TECHNICAL FIELD

The present disclosure generally relates to wireless communication, particularly to methods and apparatuses for demodulation reference signal (DMRS) transmission based on shortened Transmission Time Intervals (TTIs) in a communication system.

BACKGROUND

This section is intended to provide a background to the various embodiments of the invention that are described in this disclosure. The description herein may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs). The radio protocol stacks of the E-UTRAN is given including a radio resource control layer (RRC), a packet data convergence protocol layer (PDCP), a radio link control layer (RLC), a media access control layer (MAC), and a physical layer (PHY).

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the UE to the eNodeB via a physical uplink shared channel (PUSCH). The PUSCH carries scheduled data traffic and possible control signaling. The PUSCH can be carried in subframes of a radio frame. Further, data can also be transmitted from the eNodeB to UE via a physical downlink shared channel (PDSCH). PDSCH is also carried in one ms subframes and is downlink scheduled over respective TTIs. The UE can transmit acknowledgement (ACK)/non-acknowledgement (NACK) feedback to the base station via a physical uplink control channel (PUCCH), which may be used to carry uplink control information. Conventionally, a one millisecond (ms) subframe containing 14 symbols, can only allow a one ms TTI, which is the smallest time unit to schedule the DL and UL transmission.

Demodulation reference signals (DMRS) are used in Time Division Duplexing (TDD) or/and Frequency Division Duplexing (FDD) wireless communication systems to determine the quality of downlink and uplink channels.

According to the current 3GPP specifications, DMRS signals are configured with PUCCH/PUSCH/PDSCH channels at the time. 1A-1C schematically illustrate example patterns of DMRS in PUCCH, PUSCH, PDSCH structures of existing LTE systems. In every TTI that supports 14 symbols, multiple symbols need to be assigned to DMRS transmission.

In the 3GPP RAN #67 meeting, the Study Item on "Study on Latency reduction techniques for LTE" was approved. For RAN1, TTI shortening and reduced processing times should be studied and documented at least in following aspects:

study feasibility and performance of TTI lengths between 0.5 ms and one OFDM symbol is studied, taking into account impact on reference signals and physical layer control signaling;

backwards compatibility shall be preserved, thus allowing normal operation of pre-Rel 13 UEs on the same carrier.

Nevertheless, it is concluded in the study that "by reducing the TTI length, the network can schedule the UE faster, which reduces the round trip time (RTT). A reduction in RTT increases the TCP throughput. A reduction of TTI length may also increase the system capacity for small data transmission."

Therefore, there is a need to provide solutions for DMRS communication based on short TTIs in a wireless communication system.

SUMMARY

It is noted that since the number of symbols in one TTI is reduced in view of latency reduction technique, if DMRS signals are introduced for each TTI, DMRS overhead must be considerable, especially for short TTI including 1 or 2 symbols. In addition, channel condition may not vary much, especially for continuous scheduling or short TTI in high frequency. In that sense, some DMRS may not be necessary in demodulating control information or data.

To solve the above problem, one or more method and apparatus embodiments according to the present disclosure aim to provide solutions for DMRS communication based on shortened TTIs. Other features and advantages of embodiments of the present disclosure will also be understood from the following description of specific embodiments when read in conjunction with the accompanying drawings, which illustrate the principles of embodiments of the present disclosure.

According to the first aspect of the present disclosure, there is provided a method for communication by a base station operating in a wireless communication system. The method comprises: receiving, from a user equipment, an uplink demodulation reference signal, DMRS, in an uplink transmission time interval, TTI, of an uplink subframe, which supports two or more uplink TTIs. At least one uplink TTI supported by the uplink subframe is configured to only transmit uplink control information and/or uplink data without any uplink DMRS.

According to the second aspect of the present disclosure, there is provided a method for communication by a base station operating in a wireless communication system. The method comprises: transmitting, to a user equipment, a downlink DMRS in a downlink TTI of a downlink subframe which supports two or more downlink TTIs. At least one downlink TTI supported by the downlink subframe is configured to only transmit downlink control information and/or downlink data without any downlink DMRS.

According to the third aspect of the present disclosure, there is provided a method for communication by a user equipment operating in a wireless communication system. The method comprises: transmitting, to a base station, an uplink demodulation reference signal, DMRS, in an uplink transmission time interval, TTI, of an uplink subframe, which supports two or more uplink TTIs. At least one uplink TTI supported by the uplink subframe is configured to only transmit uplink control information and/or uplink data without any uplink DMRS.

According to the fourth aspect of the present disclosure, there is provided a method for communication by a user equipment operating in a wireless communication system. The method comprises: receiving, from a base station, a downlink DMRS in a downlink TTI of a downlink subframe which supports two or more downlink TTIs. At least one downlink TTI after the downlink TTI in which the downlink DMRS is received is arranged not to transmit any downlink DMRS.

According to further aspects of the present disclosure, there provides a base station. The base station comprises a transmitting unit and a receiving unit, which are adapted to perform functions as described above in the first, second aspects of the present disclosure.

According to further aspects of the present disclosure, there provides a user equipment. The user equipment comprises a transmitting unit and a receiving unit, which are adapted to perform functions as described above in the third, fourth aspects of the present disclosure.

According to further aspects of the present disclosure, there also provides a base station. The base station comprises processing means adapted to perform the methods for communication by a base station according to any of various embodiments of the present disclosure.

According to further aspects of the present disclosure, there also provides a user equipment. The user equipment comprises processing means adapted to perform the methods for communication by a user equipment according to any of various embodiments of the present disclosure.

BRIEF DESCRIPTION OF THE DRAWINGS

Inventive features regarded as the characteristics of the present invention are set forth in the appended claims. However, the present invention, its implementation mode, other objectives, features and advantages will be better understood through reading the following detailed description on the exemplary embodiments with reference to the accompanying drawings, where in the drawings:

FIGS. 1A-1C schematically illustrate example DMRS patterns configured in PUCCH, PUSCH, PDSCH, respectively, for a wireless communication system;

FIG. 5 is a diagram schematically illustrating a method for communication by a base station according to one or more embodiments of the present disclosure;

FIG. 6 is a diagram schematically illustrating a method for communication by a user equipment according to one or more embodiments of the present disclosure;

DETAILED DESCRIPTION

Figure 2A:
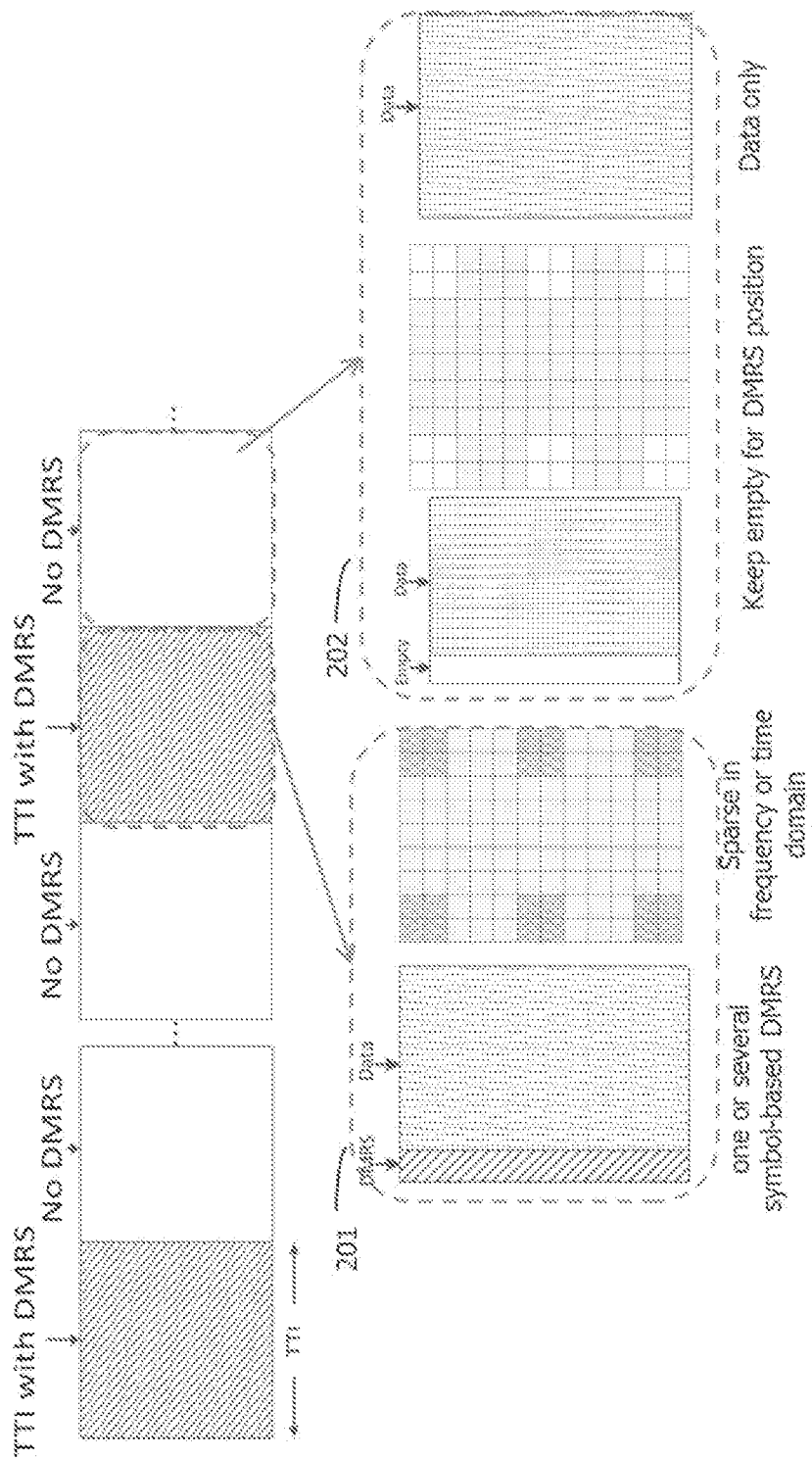
FIGS. 2A-2B are a diagram schematically illustrating example DMRS structures applicable to multiple short TTIs according to embodiments of the present disclosure.

Hereinafter, embodiments of the present disclosure will be described with reference to the accompanying drawings. In the following description, many specific details are illustrated so as to understand the present disclosure more comprehensively. However, it is apparent to the skilled in the art that implementation of the present invention may not have these details. Additionally, it should be understood that the present invention is not limited to the particular embodiments as introduced here. On the contrary, any combination of the following features and elements may be considered to implement and practice the present invention, regardless of whether they involve different embodiments. For example, while it is described below in the context of 5G cellular communication system for illustrative purposes, those skilled in the art will recognize that one or more embodiments of the present disclosure can also be applied to various other types of cellular communication systems. Thus, the following aspects, features, embodiments and advantages are only for illustrative purposes, and should not be understood as elements or limitations of the appended claims, unless otherwise explicitly specified in the claims.

A user equipment (UE) may comprise, be implemented as, or known as an access terminal, a subscriber station, a subscriber unit, a mobile station, a remote station, a remote terminal, a user terminal, a user agent, a user device, a user station, or some other terminology.

In some implementations, a user equipment may comprise a cellular telephone, a cordless telephone, a Session Initiation Protocol (SIP) phone, a personal digital assistant (PDA), a handheld device having wireless connection capability, a Station (STA), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

A base station (BS) may comprise, be implemented as, or known as NodeB, Radio Network Controller (RNC), eNodeB (eNB), Base Station Controller (BSC), Base Transceiver Station (BTS), Transceiver Function (TF), Radio Router, Radio Transceiver, Basic Service Set (BSS), Extended Service Set (ESS), Radio Base Station (RBS), or some other terminology.

As discussed above, the number of symbols in one UL/DL TTI needs to be reduced in order to reduce latency. However, in the existing LTE technique, DMRS is introduced for each TTI and occupy at least one symbol. DMRS overhead consumes radio resources significantly both in time and frequency domain, especially in the condition that a short TTI includes 1 or 2 symbols. In addition, channel condition may not vary very much among short TTIs, especially for continuous scheduling or in high frequency. In that sense, it may cause the problem in radio resource efficiency to configure DMRS together with various physical channels in each TTI.

To solve the above problem, one or more method and apparatus embodiments according to the present disclosure aim to provide solutions for DMRS communication based on shortened TTIs, where UL/DL DMRS can be transmitted independently from transmission of respective physical channels, such as, physical uplink shared channel (PUSCH), physical uplink control channel (PUCCH), physical downlink shared channel (PDSCH). In other words, the transmission of DMRS is controlled by separate means from that controls the transmission of respective physical channels. According to various embodiments of the present disclosure, DMRS may be triggered to be transmitted dynamically. According to additional or alternative embodiments of the present disclosure, transmission of DMRS is set with one or more periodic patterns, which may be configured with high layer signaling. The means for controlling DMRS transmission independently can be applied in any suitable combination way. As a consequence, for example, some of TTIs may be transmitted without DMRS in a short TTI, while some of TTIs may be controlled to transmit additional DMRS in candidate DMRS positions.

Figure 2B:
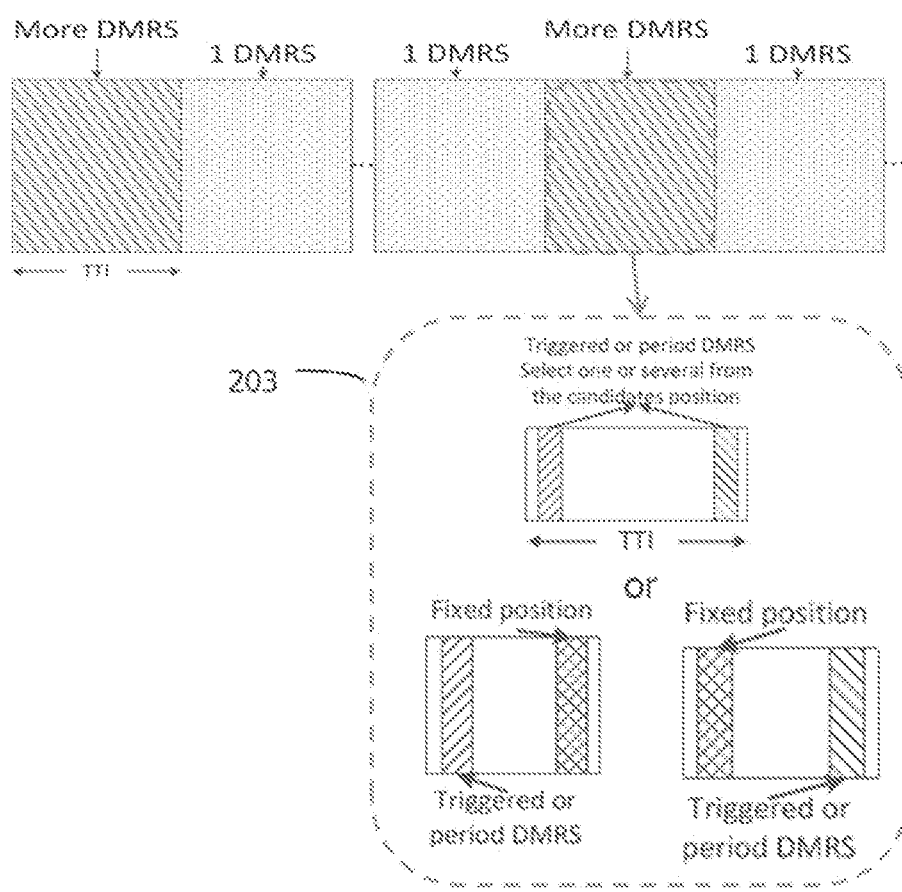

FIGS. 2A and 2B are diagrams schematically illustrating example DMRS structures applicable to multiple short TTIs according to embodiments of the present disclosure. For the purpose of conciseness of the description, let us suppose TTIs discussed with reference to FIGS. 2A and 2B includes two or more symbols.

FIG. 2A shows a subframe structure where DMRS may be controlled to only be transmitted in some TTIs, while there is no DMRS transmission in some other TTIs.

In dashed block 201, example structures for TTIs with DMRS transmission are illustrated. In one example, DMRS may occupy one or multiple symbols of one TTI, and the remaining symbols of the TTI can be used to transmit data or control information depending upon the type of the physical channel that is currently scheduled in this TTI. In another example, DMRS may be sparse in time and/or frequency domain, which, for example, occupy part of frequency resources of one or more symbols in one TTI. The remaining symbols of the TTI can be used to transmit data or control information depending upon the specific type of the physical channel that is currently scheduled in the TTI.

Dashed block 202 provides example structures for no-DMRS TTIs. When there is no DMRS transmission in a TTI, in one example, the DMRS positions may be reserved and kept empty even if the remaining symbols of the TTI are occupied by data or control information. In this example, those predefined radio resources are dedicated to transmit DMRS and cannot be used to transmit data or control information. It will be more efficient if data or control information can use those radio resources for DMRS transmission if there is actually no DMRS transmitted in this TTI. In that example, all symbols of the TTI can be assigned to data or control information transmission. It should be appreciated that DMRS structure for short TTIs may also be designed in a way of any suitable combination of the above resource-reserved and the resource-shared modes.

FIG. 2B shows a subframe structure where in some TTIs, additional DMRS transmission may be activated than other normal TTIs.

As shown in FIG. 2B, candidate DMRS position may be predefined in a TTI. When DMRS transmission is triggered or configured by a higher layer signaling, one or several DMRS positions may be selected from those candidate DMRS positions based on the triggering information or the higher layer signaling. For the purpose of backward compatibility, the new DMRS structure may support the fixed DMRS positions as specified in existing LTE (as discussed with reference to FIGS. 1A-1C). When additional DMRS is triggered or configured by a higher layer signaling, besides the fixed DMRS positions, extra DMRS may be transmitted as need.

Figure 3A:
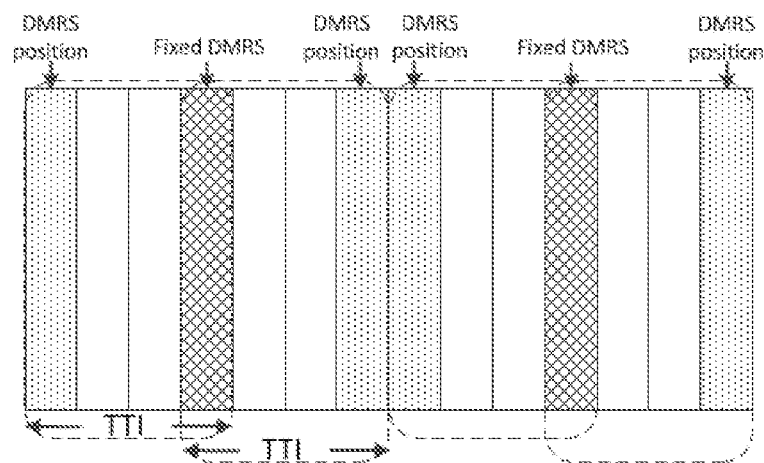
FIGS. 3A and 3B are diagram schematically illustrating example DMRS structures with candidate DMRS positions and fixed DMRS positions according to one or more embodiments of the present disclosure.
Figure 3B:
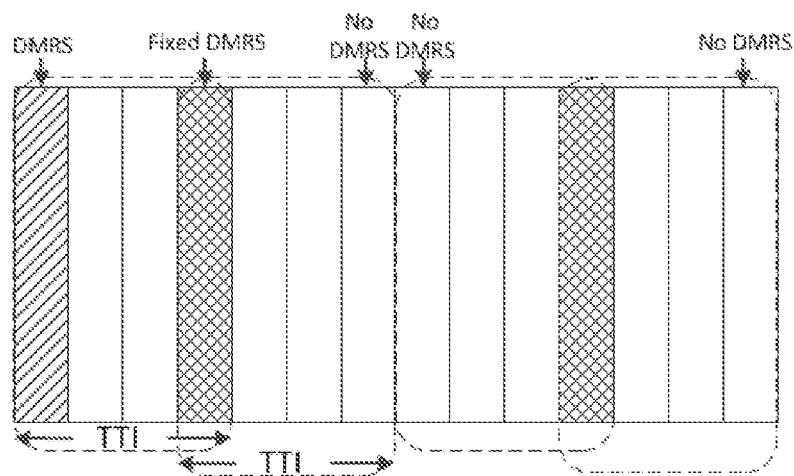

FIGS. 3A and 3B are diagram schematically illustrating example DMRS structures with candidate DMRS positions and fixed DMRS positions according to one or more embodiments of the present disclosure.

In some implementation, when frequency offset estimation is needed, then one additional DMRS can be configured (by a trigger or periodically). Otherwise, only original fixed DMRS is transmitted (history frequency offset can be reused). FIG. 3A illustrates a subframe structure with fixed DMRS positions such as legacy DMRS position. As shown in FIG. 3A, a TTI is constituted with 4 symbols, in which one symbol in the fixed DMRS is shared by two consecutive TTIs. Additional DMRS positions may be arranged in each TTI. By separate controlling means of, for example, triggering by a specified trigger or transmitting in a periodic manner configured by a higher layer signaling, DMRS transmission may be activated in some of additional candidate DMRS positions. For example, as shown in FIG. 3B, the additional DMRS position in the first TTI as shown is configured to transmit DMRS. In the following TTIs as shown, no DMRS transmission is configured in the additional DMRS positions, so that DMRS is only transmitted in the fixed positions in these TTIs.

Figure 4A:
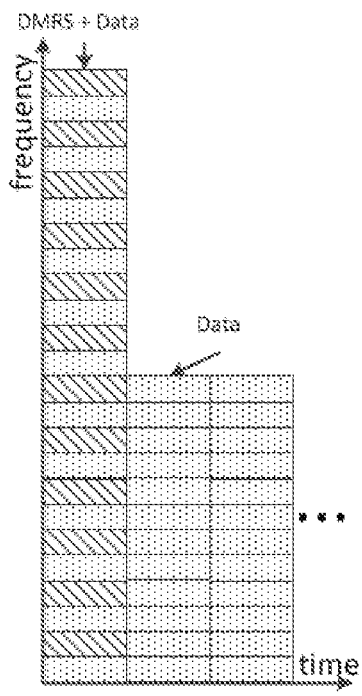
FIGS. 4A-4C are diagrams schematically illustrating example DMRS structure suitable for a 1-symbol-based TTI according to one or more embodiments of the present disclosure.
Figure 4B:
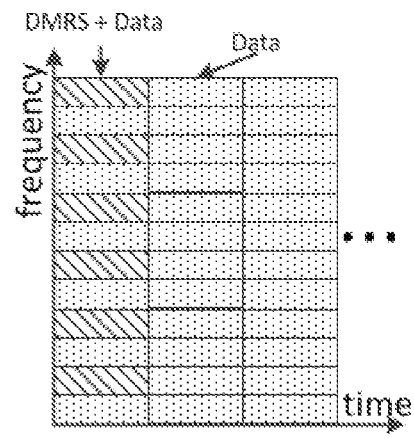
Figure 4C:
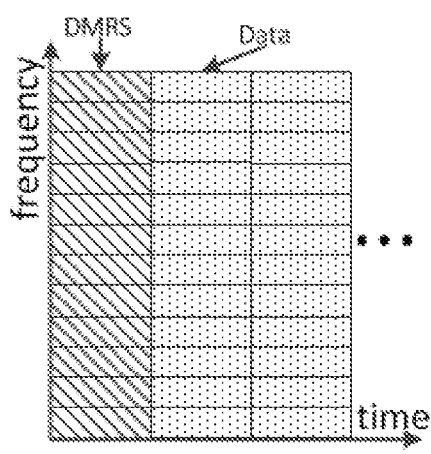

FIGS. 4A-4C are diagrams schematically illustrating example DMRS structure suitable for a 1-symbol-based TTI according to one or more embodiments of the present disclosure.

When DMRS is configured in a TTI constituted with only one symbol, DMRS may be multiplexed with data or control information (e.g., PUSCH, PUSCH, PDSCH) in the same symbol. FIGS. 4A and 4B show two different multiplexing manners for DMRS and data/control information. In the example as shown in FIG. 4A, the 1-symbol-based TTI with DMRS multiplexed with data/control information may adopt a structure different from those symbols without DMRS. The 1-symbol-based TTI occupies more frequency resource than a symbol without multiplexed DMRS. In the example of FIG. 4B, the 1-symbol-based TTI with DMRS may alternatively FIG. 4C illustrates another example where DMRS is transmitted in different symbols from physical channels (PUSCH/PUCCH/PDSCH). As shown in FIG. 4C, DMRS occupies all resource of a 1-symbol-based TTI and may be transmitted prior to the data or control information. There is no multiplexing between data/control information and DMRS in a 1-symbol-based TTI.

More generally, in a L-symbol-based TTI, the number of DMRS (K, K>=0) may be configured dynamically, for example, by downlink control information (DCI) and/or semi-statically, for example, by higher layer signaling; and L-K symbols are configured for data/control information. Alternatively, in a TTI, DMRS can be sparse and multiplexed with data/control information in frequency domain. In some implementations, different TTIs or TTI groups may have independent number of DMRS. For example, TTI groups may be consecutive TTIs or periodic TTIs with different period and/or offset. TTI group size may also be configured, e.g. dynamically indicated in DCI or semi-statically indicated with higher layer information. The independent number of DMRS may also be configured dynamically by DCI and/or semi-statically by higher layer signaling. As discussed above, DMRS may be configured in some candidate positions. Additionally or alternatively, newly triggered DMRS may have a different pattern as configured.

FIG. 5 is a diagram schematically illustrating a method 500 for communication by a base station according to one or more embodiments of the present disclosure. The method 500 of FIG. 5 describes the process of uplink DMRS transmission from the perspective of the base station. As shown in FIG. 5, in step S510, the base station receives, from a user equipment, an uplink DMRS in an uplink TTI of an uplink subframe. The uplink subframe supports two or more uplink TTIs.

The transmission of the uplink DMRS is controlled independently from the transmission of an uplink physical channel. At least one uplink TTI supported by the uplink subframe may be configured to only transmit uplink control information and/or uplink data without any uplink DMRS. The uplink DMRS may adopt any suitable DMRS structure as described with reference to FIGS. 1-4.

According to one or more embodiments of the present disclosure, the method 500 may further comprise a step (not shown) of transmitting, to the user equipment, an uplink DMRS trigger to enable the transmission of the uplink DMRS in the uplink TTI of the uplink subframe. The uplink DMRS trigger may be carried in a downlink TTI of a downlink subframe which supports two or more downlink TTIs. As an example, the uplink DMRS trigger may be one or several bits to enable the transmission and/or configuration of corresponding DMRS. According to one or more embodiments of the present disclosure, the uplink DMRS trigger may include information on how to configure the uplink DMRS to be transmitted from the user equipment to the base station. As discussed with reference to FIGS. 2-4, several type of DMRS configuration information may be included in the trigger. By way of example, the uplink DMRS trigger may include information indicative of, but not limited to, at least one following items: the number of symbols that the uplink DMRS occupies; time duration of the triggered uplink DMRS; resource allocation for the uplink DMRS; and candidate symbol position(s) on which the uplink DMRS occupies in the uplink TTI.

According to one or more additional or alternative embodiments of the present disclosure, the uplink DMRS may be received from the user equipment periodically. The uplink DMRS is controlled to be transmitted in a periodic way by means of, for example, a higher layer signaling.

FIG. 6 is a diagram schematically illustrating a method for communication by a user equipment according to one or more embodiments of the present disclosure. The method 600 of FIG. 6 describes the process of uplink DMRS transmission from the perspective of the user equipment. As shown in FIG. 6, the user equipment transmits, in step S610, to the base station the uplink DMRS in the uplink TTI of the UL subframe supports two or more uplink TTIs.

The transmission of the uplink DMRS is controlled independently from the transmission of an uplink physical channel. At least one uplink TTI supported by the uplink subframe may be configured to only transmit uplink control information and/or uplink data without any uplink DMRS. The DMRS may adopt any suitable DMRS structure as described with reference to FIGS. 1-4.

Similarly, according to one or more embodiments of the present disclosure, the method 600 may further comprise a step (not shown) of receiving, from a base station, an uplink DMRS trigger to enable the transmission of the uplink DMRS in the uplink TTI of the uplink subframe. The uplink DMRS trigger may be carried in a downlink TTI of a downlink subframe which supports two or more downlink TTIs. As an example, the uplink DMRS trigger may be one or several bits to enable the transmission and/or configuration of corresponding DMRS. According to one or more embodiments of the present disclosure, the uplink DMRS trigger may include information on how to configure the uplink DMRS to be transmitted from the user equipment to the base station. As discussed with reference to FIGS. 2-4, several type of DMRS configuration information may be included in the trigger. By way of example, the trigger may indicate which candidate symbol position(s) the uplink DMRS occupies in the uplink TTI. The user equipment may trigger the transmission of uplink DMRS according to the configuration information indicated in the received trigger.

According to one or more additional or alternative of the present disclosure, the uplink DMRS may be received from the user equipment periodically. The uplink DMRS is controlled to be transmitted in a periodic way by means of, for example, a higher layer signaling.

Figure 7A:
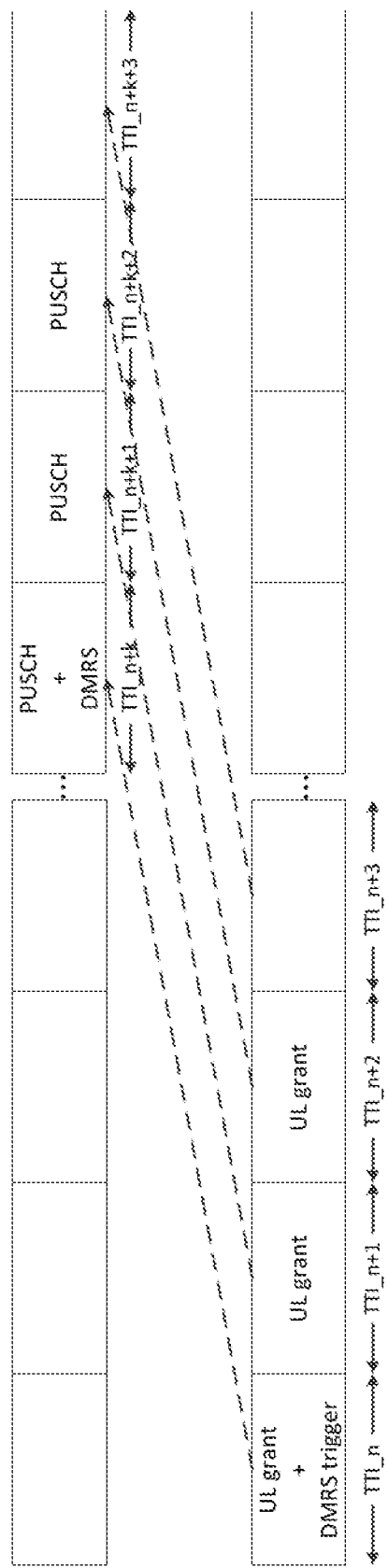
FIGS. 7A-7C are diagrams schematically illustrating example UL and DL subframes with uplink DMRS according to one or more embodiments of the present disclosure.
Figure 7B:
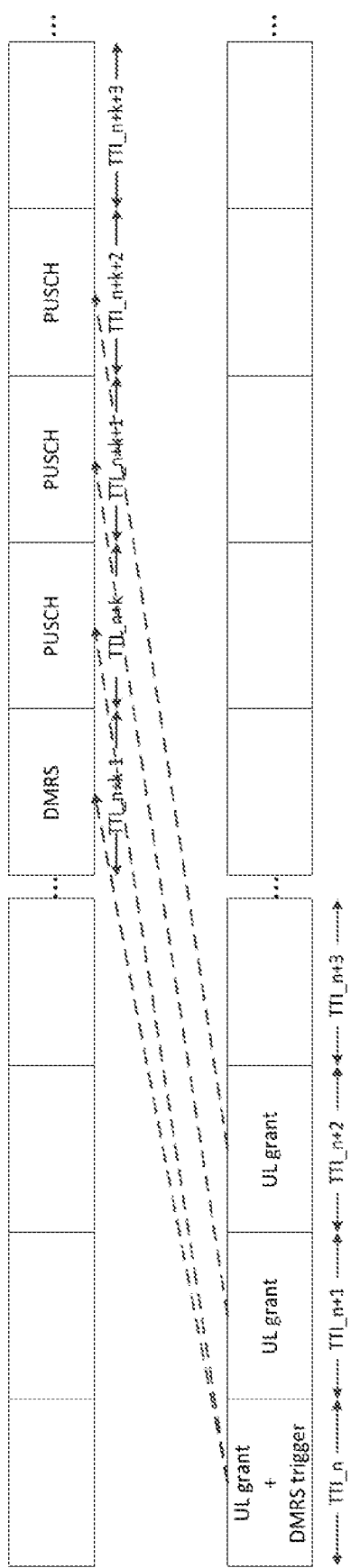
Figure 7C:
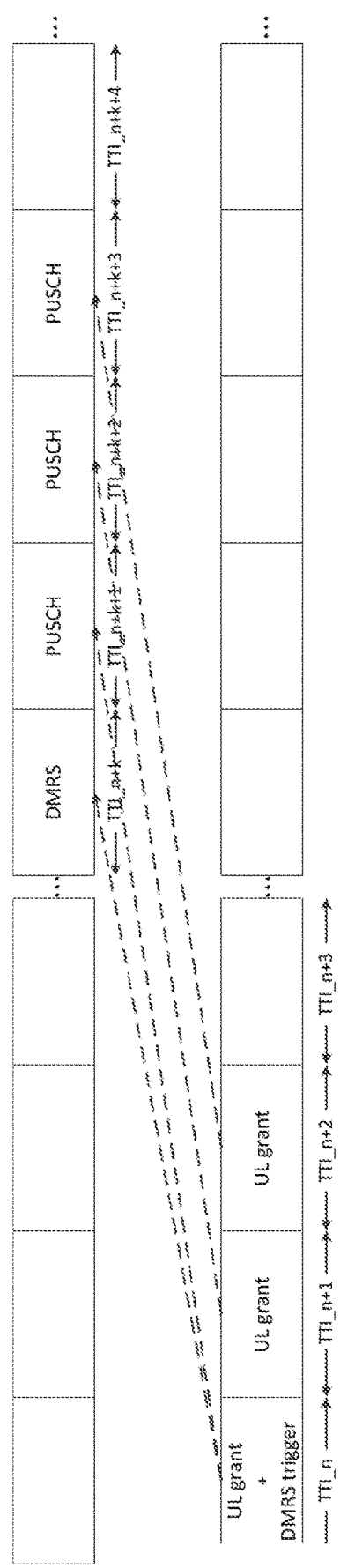

FIGS. 7A-7C are diagrams schematically illustrating example UL and DL subframes with uplink DMRS according to one or more embodiments of the present disclosure, where uplink DMRS is transmitted during an uplink data scheduling process.

During an uplink data scheduling process, the base station may transmit the uplink DMRS trigger to the user equipment by including it in DCI for uplink data scheduling (i.e., UL grant). By way of example, one or more bits may be added to existing DCI format 0 and/or format 4 to represent the uplink DMRS trigger. At that case, the downlink TTI is arranged to schedule both uplink data (PUSCH) and triggered uplink DMRS.

As shown in FIG. 7A, the base station transmits DCI for uplink data scheduling (i.e., UL grant) in DL TTI_n. As a response, the user equipment will transmit the uplink data transmission (i.e., PUSCH) in UL TTI_n+k, where k is an integer and may be normally set as 4 in a FDD system, and predefined according to the uplink/downlink configurations in a TDD system. When detecting the uplink DMRS trigger included in the DCI received in DL TTI_n, the user equipment may transmit, in UL TTI_n+k, the uplink DMRS according to the DMRS configuration information contained in the trigger. In this way, the uplink DMRS and PUSCH share the same UL TTI_n+k. As described in FIGS. 2-4, the uplink DMRS and uplink data may be multiplexed in frequency domain and/or the uplink DMRS occupies M symbols of UL TTI_n+k and the remaining symbols of UL TTI_n+k is used to transmit the scheduled uplink data. As a consequent, the PUSCH in UL TTI_n+k may be shortened to occupy (L−M) symbols. Alternatively, PUSCH and DMRS may be staggered in frequency domain, just as shown in FIG. 4A or 4B.

When the channel conditions change a little, the base station may decide not to trigger the transmission of uplink DMRS, the channel condition estimation can be obtained based on the previous DMRS. For example, in DL TTI_n+1, DL TTI_n+2, no trigger is contained in DCI. Therefore, the user equipment will transmit scheduled uplink data in UL TTI_n+k+1, UL TTI_n+k+2, in which there is no UL DMRS transmitted.

FIG. 7B shows another example for dealing with the situation where the base station schedules uplink data and triggers uplink DMRS in the same DL TTI. In this example, the uplink DMRS may be configured to be transmitted in advance. As shown in FIG. 7B, it may be predefined that when receiving the uplink DMRS trigger together with the DCI in DL TTI_n, the user equipment can transmit the triggered DMRS in UL TTI_n+k−1. Then in UL TTI_n+k, the user equipment transmits the uplink data scheduled by the DCI. Here, n represents the TTI number of the downlink TTI in which downlink control information for uplink data scheduling is transmitted; and k is a predefined integer which represents a predefined number of TTIs for scheduling.

FIG. 7C shows yet another example for dealing with the situation where the base station schedules uplink data and triggers uplink DMRS in the same DL TTI. In this example, transmission of scheduled uplink data may be delayed one TTI after the uplink DMRS is transmitted. As shown in FIG. 7C, it may be predefined that when receiving the uplink DMRS trigger together with the DCI in DL TTI_n, the user equipment can transmit the triggered DMRS in UL TTI_n+k. Then in UL TTI_n+k+1, the user equipment transmits the uplink data scheduled by the DCI. Here, n represents the TTI number of the downlink TTI in which downlink control information for uplink data scheduling is transmitted; and k is a predefined integer which represents a predefined number of TTIs without DMRS transmission, the base station may demodulate the received PUSCH with reference to the previously received uplink DMRS.

Here, those skilled in the art should appreciate that similar schemes as discussed with reference to FIGS. 7A-7C may also be applied to those embodiments where periodic uplink DMRS is configured semi-statically by higher layer signaling, in order to solve the problem caused by the collision between transmissions of the uplink DMRS and uplink data (e.g., PUSCH).

In some embodiments, the uplink DMRS trigger may be received separately from the DCI for uplink data scheduling. That means, the uplink DMRS trigger may be send separately in a TTI without DCI for uplink scheduling.

Figure 8:
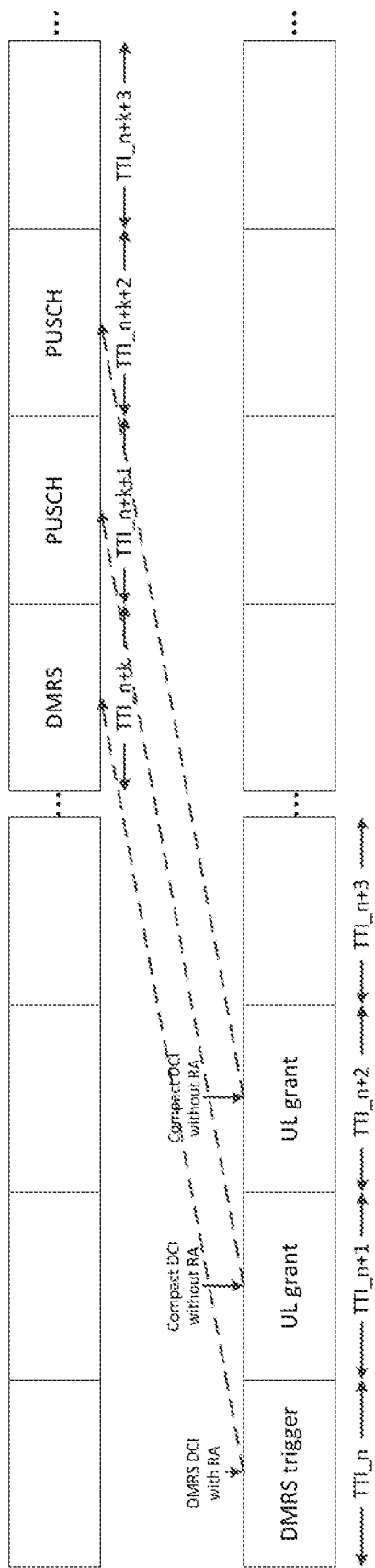
FIG. 8 is a diagram schematically illustrating example UL and DL subframes with uplink DMRS according to a further embodiment of the present disclosure.

FIG. 8 is a diagram schematically illustrating example UL and DL subframes with uplink DMRS according to a further embodiment of the present disclosure where the uplink DMRS trigger is transmitted separately in DL TTI_n. As shown in FIG. 8, in such embodiments, the triggered uplink DMRS will not collide with scheduled uplink data. For example, in response to the trigger received in DL TTI_n, the user equipment may transmit uplink DMRS in UL TTI_n+k. And in response to DCI for uplink data scheduling received in DL TTI_n+1, the user equipment may transmit scheduled uplink data in UL TTI_n+k+1.

In an implementation, when the user equipment needs PUSCH transmission, after schedule request, the base station may trigger uplink DMRS by sending an uplink DMRS trigger in a separate TTI. In the uplink DMRS trigger, resource allocation field may be contained. After the DMRS trigger, the base station can schedule PUSCH by sending compact DCI for uplink data scheduling, because the user equipment may refer to the resource allocation field in the uplink DMRS trigger to perform subsequent uplink data transmission.

During a downlink data scheduling process, uplink DMRS may also be needed to demodulate the uplink control channels (e.g., PUCCH). Therefore, according to one or more embodiments of the present disclosure, the base station may transmit to the user equipment an uplink DMRS trigger as need so as to trigger the transmission of the uplink DMRS. Additionally or alternatively, the uplink DMRS may be controlled to be transmitted in a periodic way by means of, for example, a higher layer signaling so as to meet the requirement of PUCCH demodulation.

Figure 9:
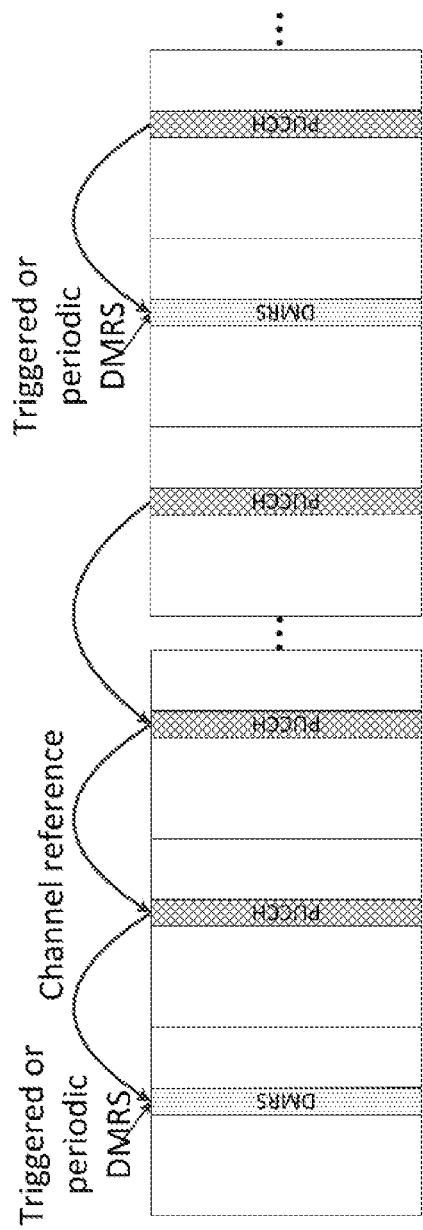
FIG. 9 is a diagram schematically illustrating example scheme for demodulating PUCCH channels based on uplink DMRS according to one or more embodiments of the present disclosure.

FIG. 9 is a diagram schematically illustrating example scheme for demodulating PUCCH channels based on uplink DMRS according to one or more embodiments of the present disclosure. As shown in FIG. 9, the uplink DMRS is transmitted independently with PUCCH. For example, period and/or offset of uplink DMRS and PUCCH (including CQI/PMI/RI) may be different. In another example, uplink DMRS is aperiodic, because it may be triggered by the base station, for example, in DCI information.

Since PUCCH is be modulated on transformed or same ZC sequence as the uplink DMRS, after demodulation the PUCCH information, the remaining sequence can be used as demodulation reference signal for channel estimation, which provides reference to next subsequent PUCCH and/or uplink data. That means, a physical uplink control channel may be demodulated based on the uplink DMRS. And then, one or more subsequent physical uplink control channel may be demodulated based on the previously received uplink DMRS and/or the demodulated physical uplink control channel.

Figure 10A:
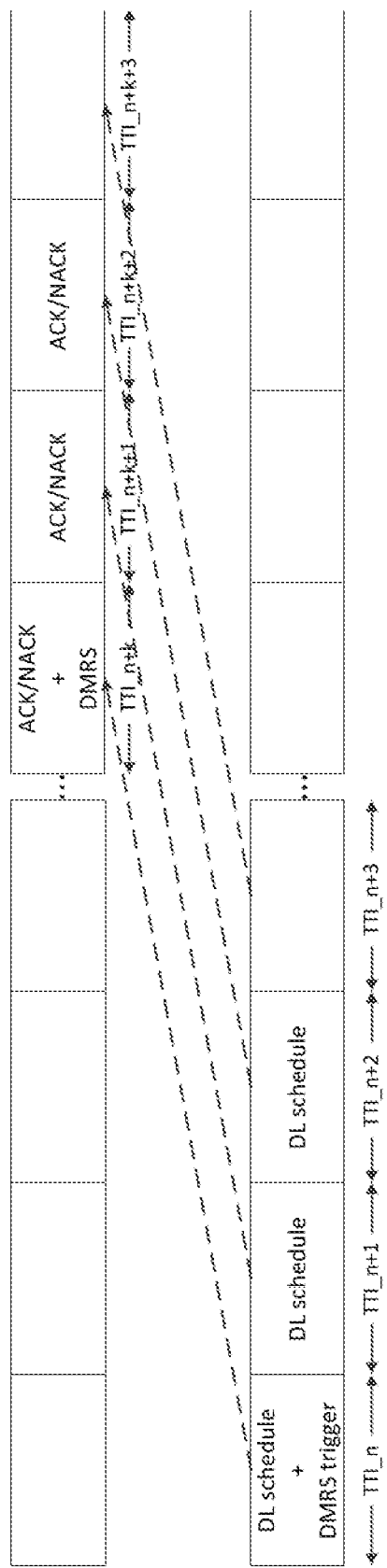
FIGS. 10A-10C are diagrams schematically illustrating example UL and DL subframes with uplink DMRS according to one or more embodiments of the present disclosure.
Figure 10B:
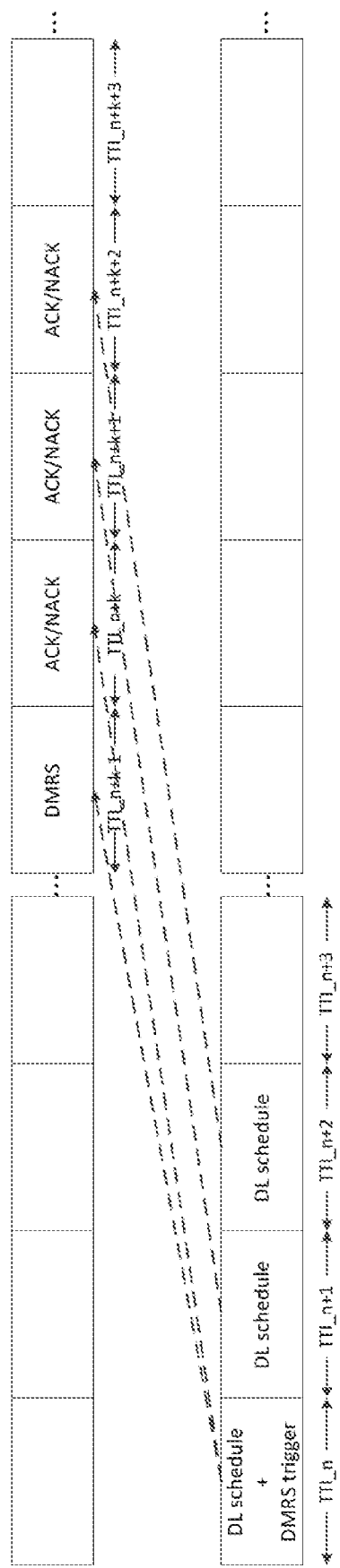
Figure 10C:
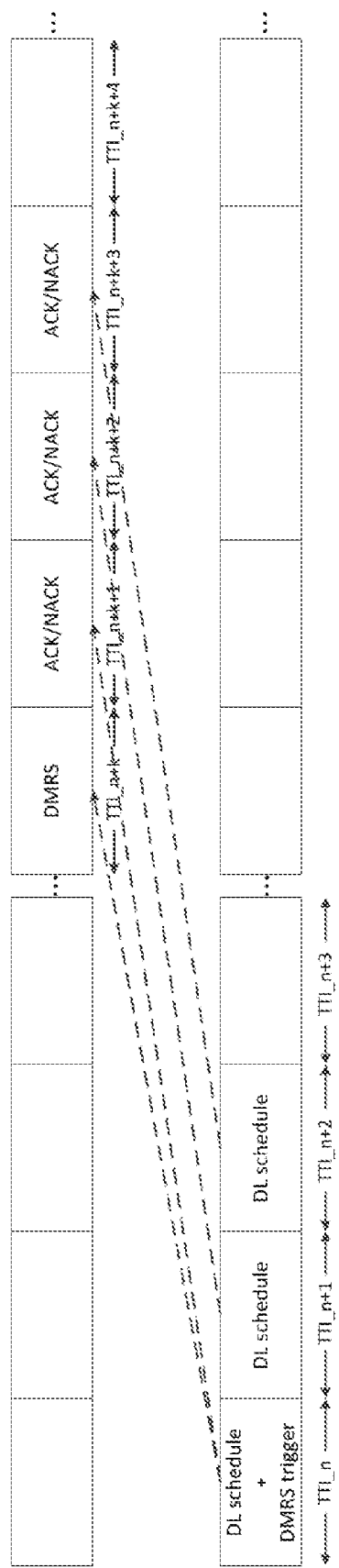

FIGS. 10A-10C are diagrams schematically illustrating example UL and DL subframes with uplink DMRS according to one or more embodiments of the present disclosure where uplink DMRS is transmitted during a downlink data scheduling process.

In a downlink data scheduling process, the user equipment needs to transmit ACK/NACK feedback information to the base station in PUCCH. As ACK/NACK feedback information is related to downlink data scheduling, both the user equipment and the base station is aware of which UL TTI the ACK/NACK feedback information will be transmitted. When the base station needs uplink DMRS from the user equipment for demodulating the ACK/NACK feedback information, the base station may trigger the transmission of uplink DMRS by transmitting a downlink DMRS trigger or configure a periodic uplink DMRS with semi-static radio resource control (RRC) signaling.

According to one or more embodiments of the present disclosure, transmission of uplink DMRS may be triggered with an uplink DMRS trigger. The base station may send the uplink DMRS trigger together with DCI for downlink data scheduling (i.e., DL schedule) in a downlink TTI. Byway of example, one or more bits may be added to existing DCI for downlink data scheduling to represent the uplink DMRS trigger. At that case, the downlink TTI is arranged to schedule both downlink data (PDSCH) and triggered uplink DMRS.

As shown in FIG. 10A, the base station transmits DCI for downlink data scheduling (i.e., DL grant) in DL TTI_n. As a response, the user equipment will transmit the ACK/NACK feedback for downlink data scheduling (in PUCCH) in UL TTI_n+k, where k is an integer, which may be normally set as 4 in a FDD system, and predefined according to the uplink/downlink configuration in a TDD system. When detecting the uplink DMRS trigger included in the DCI received in DL TTI_n, the user equipment may transmit, in UL TTI_n+k, the uplink DMRS according to the DMRS configuration information contained in the trigger. In this way, the uplink DMRS and the ACK/NACK feedback information share the same UL TTI_n+k. As described in FIGS. 2-4, the uplink DMRS and ACK/NACK feedback information may be multiplexed in frequency domain and/or the uplink DMRS occupies M symbols of UL TTI_n+k and the remaining symbols of UL TTI_n+k is used to transmit the ACK/NACK feedback information. As a consequent, the PUCCH in UL TTI_n+k may be shortened to occupy (L−M) symbols. Alternatively, PUCCH and DMRS may be staggered in frequency domain, just as shown in FIG. 4A or 4B.

When there is no need to estimate channel conditions, the base station may decide not to trigger the transmission of uplink DMRS. For example, in DL TTI_n+1, DL TTI_n+2, no trigger is contained in DCI. Therefore, the user equipment will transmit scheduled ACK/NACK feedback information in UL TTI_n+k+1, UL TTI_n+k+2, in which there is no UL DMRS transmitted. In those TTIs without DMRS transmission, the base station may demodulate the received ACK/NACK feedback information with reference to the previously received uplink DMRS.

FIG. 10B shows another example for dealing with the situation where the base station schedules downlink data and triggers uplink DMRS in the same DL TTI. In this example, the uplink DMRS may be configured to be transmitted in advance. As shown in FIG. 10B, it may be predefined that when receiving the uplink DMRS trigger together with the DCI for downlink scheduling in DL TTI_n, the user equipment can transmit the triggered DMRS in UL TTI_n+k−1. Then in UL TTI_n+k, the user equipment transmits the ACK/NACK feedback information for the downlink data scheduling. Here, n represents the TTI number of the downlink TTI in which downlink control information for downlink data scheduling is transmitted; and k is a predefined integer which represents a predefined number of TTIs for scheduling.

FIG. 10C shows yet another example for dealing with the situation where the base station schedules downlink data and triggers uplink DMRS in the same DL TTI. In this example, transmission of corresponding ACK/NACK feedback information for the downlink data scheduling may be delayed one TTI after the uplink DMRS is transmitted. As shown in FIG. 10C, it may be predefined that when receiving the uplink DMRS trigger together with the downlink data in DL TTI_n, the user equipment can firstly transmit the triggered DMRS in UL TTI_n+k. Then in UL TTI_n+k+1, the user equipment transmits the ACK/NACK feedback information for the downlink data. Here, n represents the TTI number of the downlink TTI in which downlink control information for downlink data scheduling is transmitted; and k is a predefined integer which represents a predefined number of TTIs for scheduling.

Here, those skilled in the art should appreciate that similar schemes as discussed with reference to FIGS. 10A-10C may also be applied to those embodiments where periodic uplink DMRS is configured semi-statically by higher layer signaling, in order to solve the problem caused by the collision between transmissions of the uplink DMRS and ACK/NACK feedback information (e.g., PUCCH).

According to other embodiments of the present disclosure, the uplink DMRS trigger may not be carried in DCI for downlink data scheduling. The base station may use a separate DL TTI to transmit the uplink DMRS trigger. In such embodiments, the triggered uplink DMRS may not collide with ACK/NACK feedback information for downlink data scheduling. For example, in response to the trigger received in DL TTI_n, the user equipment may transmit uplink DMRS in UL TTI_n+k. And in response to downlink data received in DL TTI_n+1, the user equipment may transmit scheduled uplink data in UL TTI_n+k+1.

Figure 11:
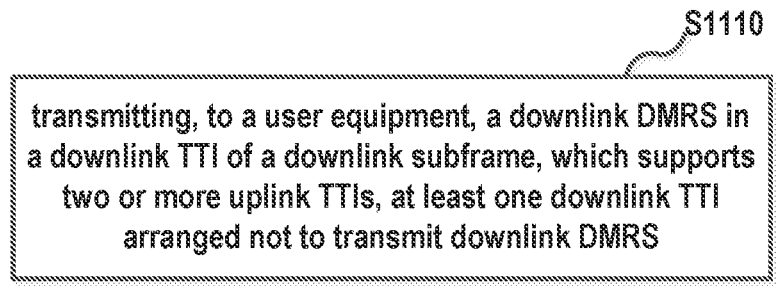
FIG. 11 is a diagram schematically illustrating a method for communication by a base station according to further one or more embodiments of the present disclosure.

FIG. 11 is a diagram schematically illustrating a method 1100 for communication by a base station according to further one or more embodiments of the present disclosure where downlink. The method 1100 of FIG. 11 describes the process of downlink DMRS transmission from the perspective of the base station. As shown in FIG. 11, in step S1110, the base station transmits, to a user equipment, a downlink DMRS in a downlink TTI of a downlink subframe. The downlink subframe supports two or more downlink TTIs.

Figure 12:
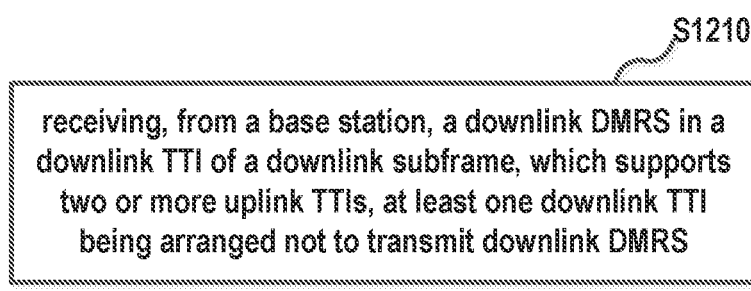
FIG. 12 is a diagram schematically illustrating a method for communication by a user equipment according to further one or more embodiments of the present disclosure.

FIG. 12 is a diagram schematically illustrating a method for communication by a user equipment according to further one or more embodiments of the present disclosure. The method 1200 of FIG. 12 describes the process of downlink DMRS transmission from the perspective of the user equipment. As shown in FIG. 12, in step S1210, the user equipment receives from a base station, an uplink demodulation reference signal, DMRS, in an uplink transmission time interval, TTI, of an uplink subframe, which supports two or more uplink TTIs The transmission of the downlink DMRS is controlled independently from the transmission of a downlink physical channel (such as PDSCH). In that way, it is possible that some downlink TTI supported by the downlink subframe may be configured to only transmit downlink control information and/or downlink data without any downlink DMRS. The downlink DMRS may adopt any suitable DMRS structure as described with reference to FIGS. 1-4.

According to one or more embodiments of the present disclosure, a downlink DMRS trigger to enable transmission of the downlink DMRS may be transmitted from the base station to the user equipment. As an example, the downlink DMRS trigger may be one or several bits to enable the transmission and/or configuration of corresponding DMRS. As discussed with reference to FIGS. 2-4, several type of DMRS configuration information may be included in the trigger. By way of example, the downlink DMRS trigger may include information indicative of, but not limited to, at least one following items: the number of symbols that the downlink DMRS occupies; time duration of the triggered downlink DMRS; resource allocation for the downlink DMRS; and candidate symbol position(s) on which the downlink DMRS occupies in the downlink TTI.

Figure 13A:
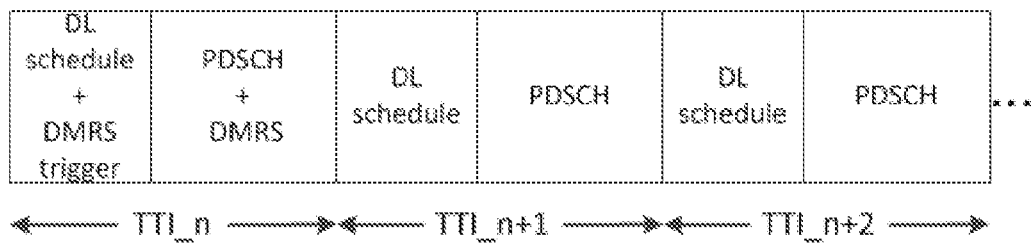
FIGS. 13A-13B are diagrams schematically illustrating example UL and DL subframes with downlink DMRS according to further one or more embodiments of the present disclosure.
Figure 13B:
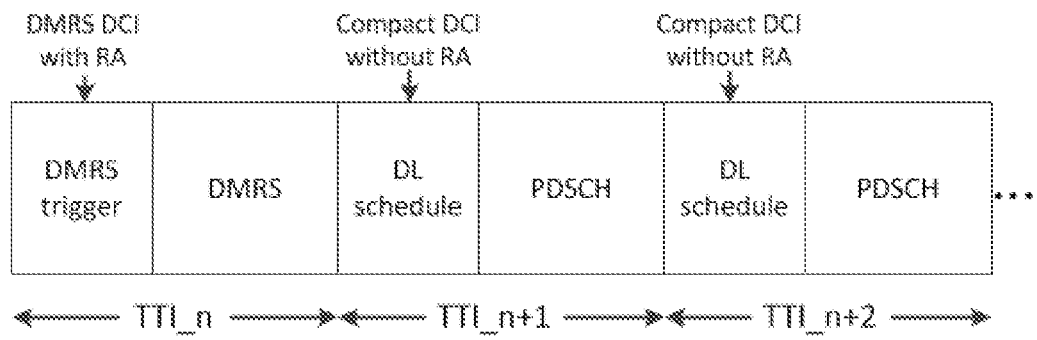

FIGS. 13A-13B are diagrams schematically illustrating example UL and DL subframes with downlink DMRS according to further one or more embodiments of the present disclosure where downlink DMRS is enabled by a downlink DMRS trigger.

According to one or more embodiments of the present disclosure, the downlink DMRS trigger to enable transmission of the downlink DMRS may be transmitted together with DCI for downlink data scheduling in the same downlink TTI. As shown in FIG. 13A, in DL TTI_n, the user equipment may transmit the downlink DMRS to the user equipment by including it in the DCI for downlink data scheduling. In some implementations, at least part of the downlink DMRS may be sparse-multiplexed with downlink data in the downlink TTI of the downlink subframe. Additionally or alternatively, the downlink DMRS may occupy one or more symbols of the downlink TTI and the remaining symbols may be used for downlink data transmission. In next downlink TTI_n+1, the base station may decide not to trigger the transmission of downlink DMRS, because the user equipment may demodulate downlink data transmitted in downlink TTI_n+1 based on the previously received downlink DMRS.

According to additional or alternative embodiments, the downlink DMRS trigger to enable transmission of the downlink DMRS may be transmitted separately from DCI for downlink data scheduling. As shown in FIG. 13B, in downlink TTI_n, a DMRS trigger is transmitted to indicate the downlink DMRS configuration information to the user equipment. In the same TTI_n, the base station transmits the downlink DMRS according to the configuration information included in the downlink DMRS trigger. According to some implementation, in view of the information of resource allocation contained in the downlink DMRS trigger, the base station may schedule PDSCH in at least one subsequent TTI by sending compact DCI for downlink data scheduling, because the user equipment may refer to the resource allocation field in the downlink DMRS trigger to perform subsequent downlink data transmission.

In order to communicate the downlink DMRS independently from scheduling a physical downlink data channel (e.g., PDSCH), according to one or more additional or alternative embodiments of the present disclosure, the downlink DMRS may be transmitted from the base station to the user equipment periodically. The downlink DMRS is controlled to be transmitted in a periodic way by means of, for example, a higher layer signaling.

Figure 14:
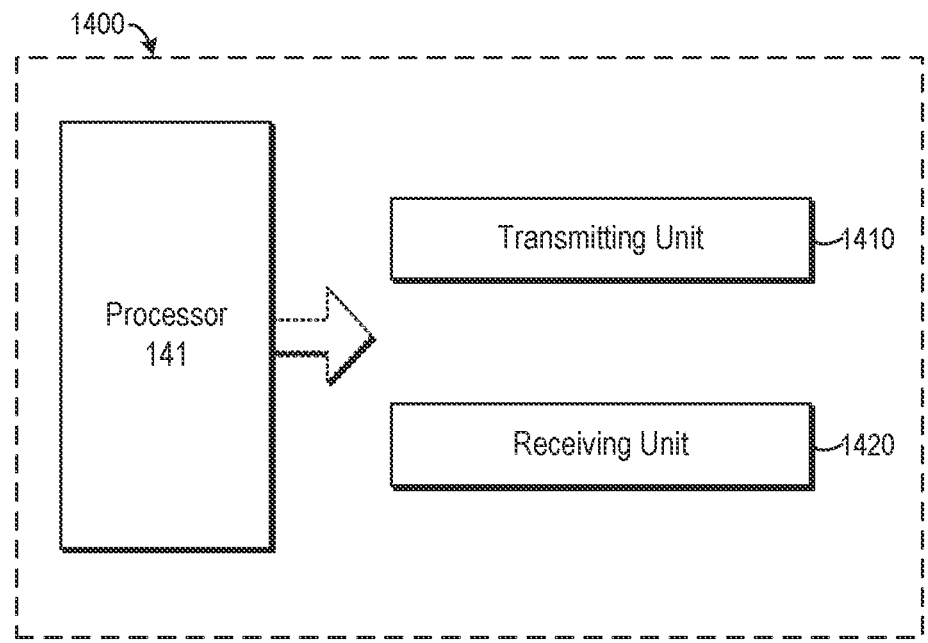
FIG. 14 is a block diagram schematically illustrating a base station according to further one or more embodiments of the present disclosure.

FIG. 14 is a block diagram schematically illustrating a base station according to further one or more embodiments of the present disclosure.

As shown in FIG. 14, the base station 1400 is configured to communicate with one or more user equipments based downlink and uplink subframe structures having short TTIs. The base station 1400 comprises: a transmitting unit 1410 and a receiving unit 1420. The base station 600 may also comprise suitable radio frequency transceivers (not shown in FIG. 14) that may be selectively coupled with one or more antenna(s) (not shown in FIG. 14) which are used to transmit signals to, and receive signals from, one or more user equipments.

The base station 1400 comprises a processor 141, which may include one or more microprocessor or microcontrollers, as well as other digital hardware, which may include digital signal processors (DSPs), special-purpose digital logic, and the like. The processor 141 may be configured to execute program code stored in memory (not shown in FIG. 14), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 141 may be used to cause the transmitting unit 1410 and the receiving unit 1420 to perform corresponding functions according one or more embodiments of the present disclosure.

According to embodiments of one aspect of the present disclosure, the receiving unit 1420 is configured to receive, from a user equipment, an uplink DMRS in an uplink TTI of an uplink subframe, which supports two or more uplink TTIs. At least one uplink TTI supported by the uplink subframe is configured to only transmit uplink control information and/or uplink data without any uplink DMRS.

According to one or more embodiments of this aspect of the present disclosure, the transmitting unit 1510 may be configured to transmit, to the user equipment, an uplink DMRS trigger to enable the transmission of the uplink DMRS in the uplink TTI of the uplink subframe. The uplink DMRS trigger may be carried in a downlink TTI of a downlink subframe which supports two or more downlink TTIs. In some embodiments, the uplink DMRS trigger may include information indicative of at least one following items: a number of symbols that the uplink DMRS occupies; a time duration of the triggered uplink DMRS; resource allocation for the uplink DMRS; and candidate symbol position(s) on which the uplink DMRS occupies in the uplink TTI.

According to one or more embodiments of this aspect of the present disclosure, the uplink DMRS trigger may be included in downlink control information for uplink data scheduling. Alternatively, the uplink DMRS trigger may be received separately from downlink control information for uplink data scheduling.

According to one or more embodiments of this aspect of the present disclosure, the uplink DMRS may be received from the user equipment periodically.

In some embodiments of this aspect of the present disclosure, the receiving unit 1420 may be further configured to receive scheduled uplink data in the uplink TTI_n+k in which the uplink DMRS is received; or receive scheduled uplink data in an uplink TTI_n+k immediately after the uplink TTI_n+k−1 in which the uplink DMRS is received; or receive scheduled uplink data in an uplink III n+k+1 immediately after the uplink III n+k in which the uplink DMRS is received. Here, n represents the TTI number of the downlink TTI in which downlink control information for uplink data scheduling is transmitted; k represents a pre-defined number of TTIs for uplink scheduling.

According to one or more embodiments of this aspect of the present disclosure, a physical uplink control channel may be demodulated based on the uplink DMRS. In some embodiments, a further physical uplink control channel may be demodulated based on the uplink DMRS and/or the demodulated physical uplink control channel.

According to one or more embodiments of this aspect of the present disclosure, the transmitting unit 1410 may be configured to transmit the uplink DMRS trigger included in downlink control information for downlink data scheduling.

According to one or more embodiments of this aspect of the present disclosure, the receiving unit 1420 may be further configured to receive acknowledgement, ACK, /non-acknowledgement, NACK, feedback information for the downlink data scheduling in the uplink TTI_n+k in which the uplink DMRS is received; or receive ACK/NACK feedback information for the downlink data scheduling in an uplink TTI n+k immediately after the uplink TTI_n+k−1 in which the uplink DMRS is received; or receive ACK/NACK feedback information for the downlink data scheduling in an uplink TTI_n+k+1 immediately after the uplink TTI_n+k in which the uplink DMRS is received. Here, n represents the TTI number of the downlink TTI in which downlink data for downlink data scheduling is transmitted; k represents a predefined number of TTIs for downlink scheduling.

According to one or more embodiments of this aspect of the present disclosure, the transmitting unit 1410 may be configured to transmit the uplink DMRS trigger separately from downlink control information for downlink data scheduling.

According to embodiments of another aspect of the present disclosure, the transmitting unit 1410 may be configured to transmit, to a user equipment, a downlink DMRS in a downlink TTI of a downlink subframe which supports two or more downlink TTIs. At least one downlink TTI supported by the downlink subframe is configured to only transmit downlink control information and/or downlink data without any downlink DMRS.

According to embodiments of this aspect of the present disclosure, the transmitting unit 1410 may be configured to transmit a downlink DMRS trigger to enable transmission of the downlink DMRS included in downlink control information for downlink data scheduling. In some embodiments, the transmitting unit 1410 may be further configured to transmit at least part of the downlink DMRS which is sparse-multiplexed with downlink data in the downlink TTI of the downlink subframe.

According to alternative embodiments of this aspect of the present disclosure, the transmitting unit 1410 may be configured to transmit a downlink DMRS trigger to enable transmission of the downlink DMRS separately from downlink control information for downlink data scheduling.

According to embodiments of this aspect of the present disclosure, the downlink DMRS trigger may include information indicative of at least one following items: a number of symbols that the downlink DMRS occupies; a time duration of the triggered downlink DMRS; resource allocation for the downlink DMRS; and candidate symbol position(s) on which the downlink DMRS occupies in the uplink TTI.

According to embodiments of this aspect of the present disclosure, the transmitting unit 1410 may be configured to transmit the downlink DMRS to the user equipment periodically.

Figure 15:
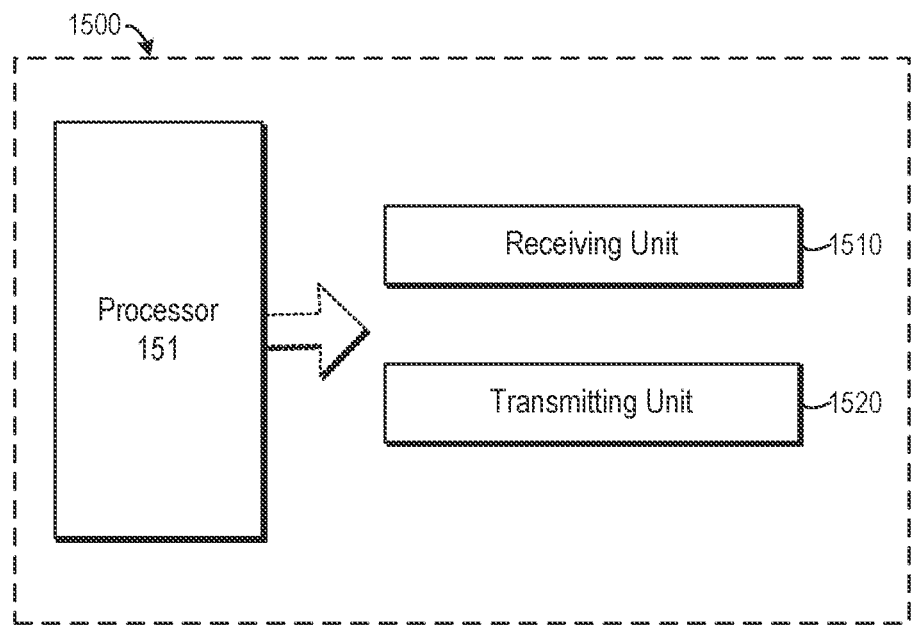
FIG. 15 is a block diagram schematically illustrating a user equipment according to further one or more embodiments of the present disclosure.

FIG. 15 is a block diagram schematically illustrating a user equipment according to further one or more embodiments of the present disclosure.

As shown in FIG. 15, the user equipment 1500 is configured to communicate with a base station based downlink and uplink subframe structures having short TTIs. The user equipment 1500 comprises a receiving unit 1510 and a transmitting unit 1520. The user equipment 1500 may also comprise multiple suitable radio frequency transceivers (not shown in FIG. 15) that may be operably coupled with one or more antenna(s) (not shown in FIG. 15) which are used to transmit signals to, and receive signals from, other radio nodes such as a NodeB, an eNodeB or a WiFi AP.

The user equipment 1500 comprises a processor 151, which may include one or more microprocessor or microcontrollers, as well as other digital hardware, which may include digital signal processors (DSPs), special-purpose digital logic, and the like. The processor 151 may be configured to execute program code stored in memory (not shown in FIG. 15), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 151 may be used to cause the receiving unit 1510 and the transmitting unit 1520 to perform corresponding functions according one or more embodiments of the present disclosure.

According to embodiments of one aspect of the present disclosure, a transmitting unit 1420 is configured to transmit, to a base station, an uplink DMRS in an uplink TTI of an uplink subframe, which supports two or more uplink TTIs. At least one uplink TTI supported by the uplink subframe is configured to only transmit uplink control information and/or uplink data without any uplink DMRS.

According to embodiments of this aspect of the present disclosure, the receiving unit 1500 is configured to receive, from a base station, an uplink DMRS trigger to enable the transmission of the uplink DMRS in the uplink TTI of the uplink subframe. The uplink DMRS trigger may be carried in a downlink TTI of a downlink subframe which supports two or more downlink TTIs. According to some embodiments, the uplink DMRS trigger may include information indicative of at least one following items: a number of symbols that the uplink DMRS occupies; a time duration of the triggered uplink DMRS; resource allocation for the uplink DMRS; and candidate symbol position(s) on which the uplink DMRS occupies in the uplink TTI.

According to embodiments of this aspect of the present disclosure, the receiving unit 1510 may be configured to receive the uplink DMRS trigger which is included in downlink control information for uplink data scheduling. In some alternative embodiments, the receiving unit 1510 may be configured to receive the uplink DMRS trigger separately from downlink control information for uplink data scheduling.

According to embodiments of this aspect of the present disclosure, the transmitting unit 1520 may be configured to transmit the uplink DMRS to the base station periodically.

In some embodiments of this aspect of the present disclosure, the transmitting unit 1520 may be further configured to: transmit scheduled uplink data in the uplink TTI_n+k in which the uplink DMRS is received; or transmit scheduled uplink data in an uplink TTI_n+k immediately after the uplink TTI_n+k−1 in which the uplink DMRS is received; or transmit scheduled uplink data in an uplink TTI_n+k+1 immediately after the uplink TTI_n+k in which the uplink DMRS is received. Here, n represents the TTI number of the downlink TTI in which downlink control information for uplink data scheduling is transmitted; k represents a predefined number of TTIs for uplink scheduling.

According to one or more embodiments of this aspect of the present disclosure, the user equipment 1500 may configured to demodulate a physical uplink control channel based on the uplink DMRS. In some embodiments, the user equipment 1500 may configured to demodulate a further physical uplink control channel based on the uplink DMRS and/or the demodulated physical uplink control channel.

According to one or more embodiments of this aspect of the present disclosure, the receiving unit 1510 may be configured to receive the uplink DMRS trigger included in downlink control information for downlink data scheduling.

According to one or more embodiments of this aspect of the present disclosure, the transmitting unit may be further configured to: transmit ACK/NACK feedback information for the downlink data scheduling in the uplink TTI_n+k in which the uplink DMRS is received; or transmit ACK/NACK feedback information for the downlink data scheduling in an uplink TTI n+k immediately after the uplink TTI_n+k−1 in which the uplink DMRS is received; or transmit ACK/NACK feedback information for the downlink data scheduling in an uplink TTI_n+k+1 immediately after the uplink TTI_n+k in which the uplink DMRS is received. Here, n represents the TTI number of the downlink TTI in which downlink data for downlink data scheduling is transmitted; k represents a predefined number of TTIs for downlink scheduling.

According to one or more embodiments of this aspect of the present disclosure, the receiving unit 1510 may be configured to receive the uplink DMRS trigger separately from downlink control information for downlink data scheduling.

According to embodiments of another aspect of the present disclosure, the receiving unit 1510 is configured to receive, from a base station, a downlink DMRS in a downlink TTI of a downlink subframe which supports two or more downlink TTIs. At least one downlink TTI after the downlink TTI in which the downlink DMRS is received is arranged not to transmit any downlink DMRS.

According to embodiments of this aspect of the present disclosure, the receiving unit 1510 may be configured to receive a downlink DMRS trigger to enable transmission of the downlink DMRS included in downlink control information for downlink data scheduling. In some embodiments, the receiving unit 1510 may be configured to receive at least part of the downlink DMRS which is sparse-multiplexed with downlink data in the downlink TTI of the downlink subframe.

According to embodiments of this aspect of the present disclosure, the receiving unit 1510 may be configured to receive a downlink DMRS trigger to enable transmission of the downlink DMRS separately from downlink control information for downlink data scheduling.

According to embodiments of this aspect of the present disclosure, the downlink DMRS trigger may include information indicative of at least one following items: a number of symbols that the downlink DMRS occupies; a time duration of the triggered downlink DMRS; resource allocation for the downlink DMRS; and candidate symbol position(s) on which the downlink DMRS occupies in the uplink TTI.

According to embodiments of this aspect of the present disclosure, the receiving unit 1510 may be configured to receive the downlink DMRS from the base station periodically.

In general, the various exemplary embodiments may be implemented in hardware or special purpose circuits, software, logical or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block and signaling diagrams, it is well understood that these blocks, apparatus, systems, techniques or methods described herein may be implemented in, as non-limiting examples, hardware, software, firmware, special purpose circuits or logical, general purpose hardware or controller or other computing devices, or some combination thereof.

As such, it should be appreciated that at least some aspects of the exemplary embodiments of the disclosure may be practiced in various components such as integrated circuit chips and modules. As well known in the art, the design of integrated circuits is by and large a highly automated process.

The present disclosure may also be embodied in the computer program product which comprises all features capable of implementing the method as depicted herein and may implement the method when loaded to the computer system.

The present disclosure has been specifically illustrated and explained with reference to the preferred embodiments. The skilled in the art should understand various changes thereto in form and details may be made without departing from the spirit and scope of the present disclosure.

What is claimed is:

1. A method of a User Equipment (UE), the method comprising:
    receiving first information from a base station in a higher layer signaling;
    receiving second information from the base station in a DCI (Downlink Control Information) format;
    determining, based on the first information, whether at least one second DMRS(s) (Demodulation Reference Signal(s)) for PDSCH (Physical Downlink Shared Channel) is mapped to at least one symbol(s) at second position(s) within a scheduling time unit in addition to a first DMRS for PDSCH,
        wherein the UE is provided, by the first information, with a group of a plurality of candidates of second position(s) within the scheduling time unit in a case where the at least one second DMRS(s) is mapped, and
        wherein the first DMRS is mapped to one symbol at a first position within the scheduling time unit regardless of the first information;
    in a case where the at least one second DMRS(s) is mapped, receiving the first DMRS and the at least one second DMRS(s) within the scheduling time unit, the second position(s) being determined from among the plurality of candidates based on the second information; and
    in a case where the at least one second DMRS(s) is not mapped, receiving the first DMRS without the at least one second DMRS(s) being received within the scheduling time unit.

2. The method of claim 1, wherein the first position is symbol 0 or symbol 3.

3. The method of claim 1, further comprising:
    receiving third information indicating the first position.

4. The method of claim 1, wherein the first position is prior to all of the second position(s) within the scheduling time unit in time domain.

5. The method of claim 1, wherein at the first position or the second position(s), the first DMRS or the at least one second DMRS(s) is mapped to one resource element from among every two resource elements in frequency domain, and
wherein remaining resource elements not used for the first DMRS or the second DMRS(s) at the first position or the second position(s) are used for transmission of the PDSCH.

6. The method of claim 1, wherein the PDSCH is not present during time duration of the first position or the second position(s).

7. The method of claim 1, wherein the first position or the second position(s) are prior to resources for the PDSCH within the scheduling time unit.

8. The method of claim 1, the method further comprising:
determining whether the second position(s) comprises more symbol(s) than the first position, based on the first information.

9. The method of claim 1, wherein the first DMRS is mapped to only one symbol at the first position within the scheduling time unit.

10. A method of a base station, the method comprising:
transmitting first information to a User Equipment (UE) in a higher layer signaling;
transmitting second information to the UE in a DCI (Downlink Control Information) format;
wherein, whether to transmit at least one second DMRS (s) (Demodulation Reference Signal(s)) for PDSCH (Physical Downlink Shared Channel) in at least one symbol(s) at second position(s) within a scheduling time unit in addition to a first DMRS for PDSCH, corresponds to the first information,
wherein the first information provides the UE with a group of a plurality of candidates of second position (s) within the scheduling time unit in a case where the at least one second DMRS(s) is transmitted, and
wherein the first DMRS is transmitted in one symbol at a first position within the scheduling time unit regardless of the first information;
in a case where the at least one second DMRS(s) is to be transmitted, transmitting the first DMRS and the at least one second DMRS(s) within the scheduling time unit, the second position(s) being determined from among the plurality of candidates based on the second information; and
in a case where the at least one second DMRS(s) is not to be transmitted, transmitting the first DMRS without the at least one second DMRS(s) being transmitted within the scheduling time unit.

11. The method of claim 10, wherein the first position is symbol 0 or symbol 3.

12. The method of claim 10, further comprising:
transmitting a-third information indicating the first position.

13. The method of claim 10, wherein the first position is prior to all of the second position(s) within the scheduling time unit in time domain.

14. The method of claim 10, wherein at the first position or the second position(s), the first DMRS or the at least one second DMRS(s) is transmitted using one resource element from among every two resource elements in frequency domain, and
wherein remaining resource elements not used for the first DMRS or the second DMRS(s) at the first position or the second position(s) are used for transmission of the PDSCH.

15. The method of claim 10, wherein the PDSCH is not present during time duration of the first position or the second position(s).

16. The method of claim 10, wherein the first position or the second position(s) are transmitted prior to resources for the PDSCH within the scheduling time unit.

17. The method of claim 10, the method further comprising:
determining whether the second position(s) comprises more symbol(s) than the first position, based on the first information.

18. The method of claim 10, wherein the first DMRS is transmitted in only one symbol at the first position within the scheduling time unit.

19. A user equipment (UE) comprising:
a transceiver configured to:
receive first information from a base station in a higher layer signaling; and
receive second information from the base station in a DCI (Downlink Control Information) format; and
a controller configured to determine, based on the first information, whether at least one second DMRS(s) (Demodulation Reference Signal(s)) for PDSCH (Physical Downlink Shared Channel) is mapped to at least one symbol(s) at second position(s) within a scheduling time unit in addition to a first DMRS for PDSCH,
wherein the UE is provided, by the first information, with a group of a plurality of candidates of second position (s) within the scheduling time unit in a case where the at least one second DMRS(s) is mapped,
wherein the first DMRS is mapped to one symbol at a first position within the scheduling time unit regardless of the first information,
wherein the controller is configured to, in a case where the at least one second DMRS(s) is mapped, control the transceiver to receive the first DMRS and the at least one second DMRS(s) within the scheduling time unit, the second position(s) being determined from among the plurality of candidates based on the second information, and
wherein the controller is configured to, in a case where the at least one second DMRS(s) is not mapped, control the transceiver to receive the first DMRS without the at least one second DMRS(s) within the scheduling time unit.

* * * * *